United States Patent [19]
Johnson et al.

[11] 3,829,217
[45] Aug. 13, 1974

[54] OIL CONDITION INDICATOR

[75] Inventors: Charles A. Johnson, Box 179, Lemmon, S. Dak. 57638; Albert L. Kimmel, Kansas City, Mo.

[73] Assignee: said Johnson, by said Kimmel

[22] Filed: Apr. 9, 1973

[21] Appl. No.: 349,642

Related U.S. Application Data

[63] Continuation of Ser. No. 144,863, May 19, 1971, abandoned.

[52] U.S. Cl..................... 356/70, 356/208, 356/246
[51] Int. Cl. ........................................... G01n 33/28
[58] Field of Search .......... 73/64; 356/70, 201, 208, 356/244, 246

[56] References Cited
UNITED STATES PATENTS

| 2,062,588 | 12/1936 | Logan et al........................... 356/70 |
| 2,062,929 | 12/1936 | Powers................................ 356/246 |
| 2,224,123 | 12/1940 | Wilson................................ 356/70 |
| 2,487,238 | 11/1949 | Hallerberg.......................... 356/208 |
| 2,782,514 | 2/1957 | Scott et al.......................... 356/70 X |
| 3,698,822 | 10/1972 | Polanyi............................... 356/246 |

FOREIGN PATENTS OR APPLICATIONS 500,892   2/1939   Great Britain...................... 356/70

Primary Examiner—Ronald L. Wibert
Assistant Examiner—F. L. Evans
Attorney, Agent, or Firm—Hofgren, Wegner, Allen, Stellman & McCord

[57] ABSTRACT

Means for indicating the condition of engine lubricating oil including a pair of relatively movable members defining therebetween a progressively increasing-in-thickness space for holding a sample of the oil. At least one of the members is made to be light-transmitting and indicium means are associated with the indicator for correlation with the progressively increasing opacity of the oil sample to provide an oil indicating condition to the user viewing the oil sample in the indicating means.

1 Claim, 15 Drawing Figures

PATENTED AUG 13 1974
3,829,217
SHEET 1 OF 2
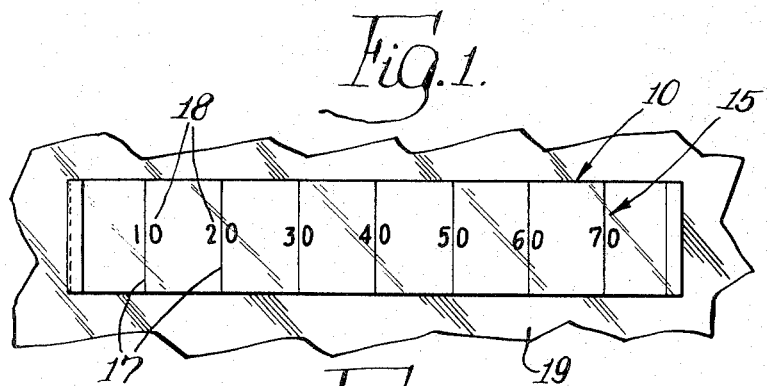
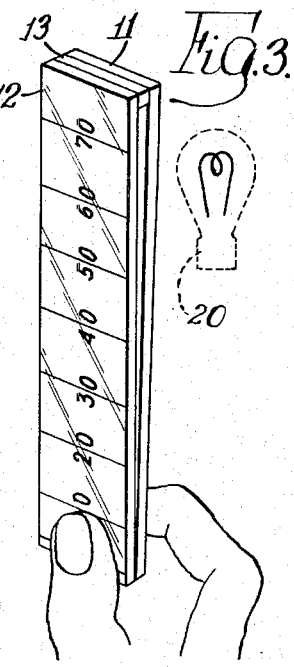
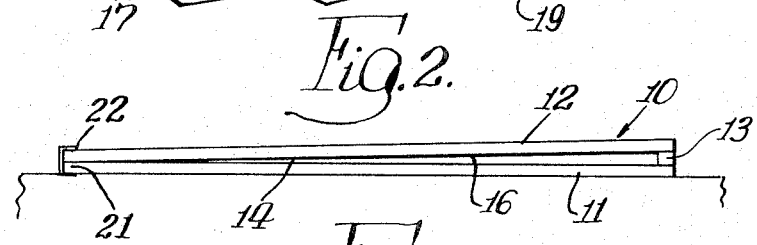
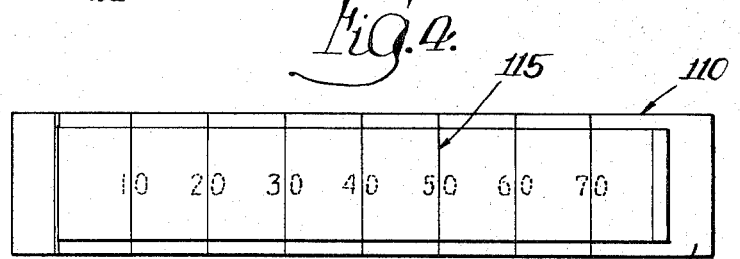
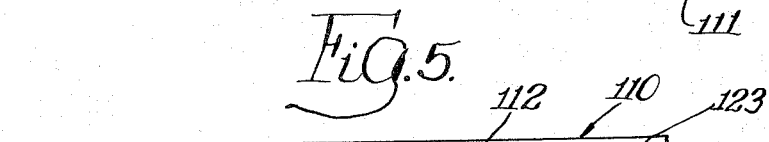
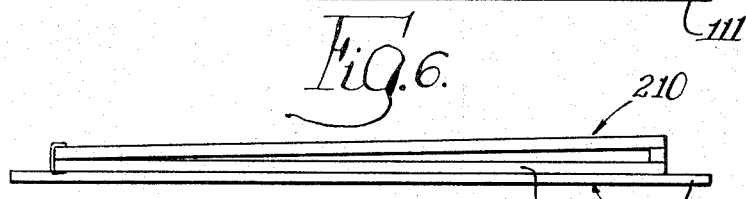
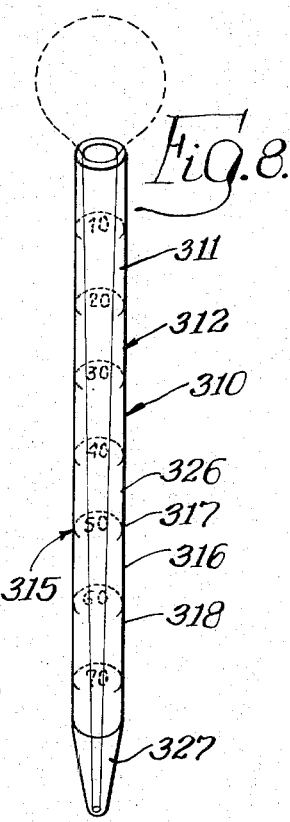
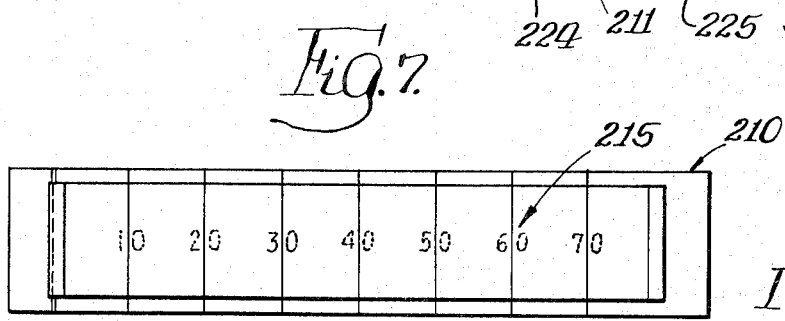
Inventors:-
Charles A. Johnson,
Albert L. Kimmel,
By Hofgren, Wegner, Allen, Stellman + McCord
Attys.

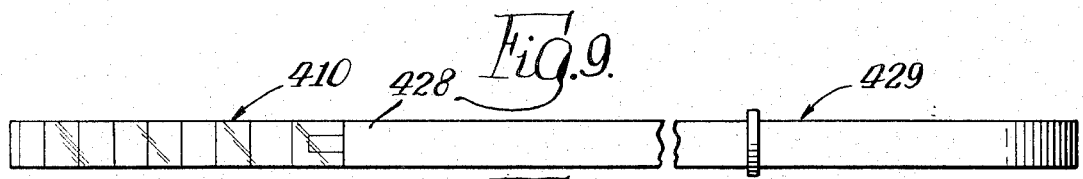
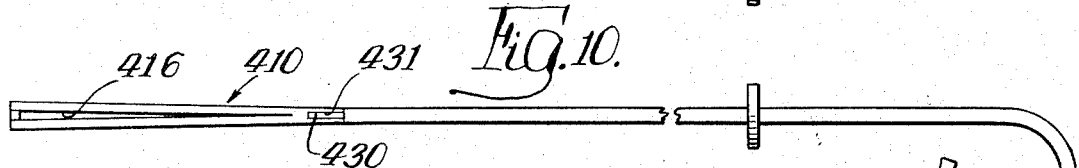
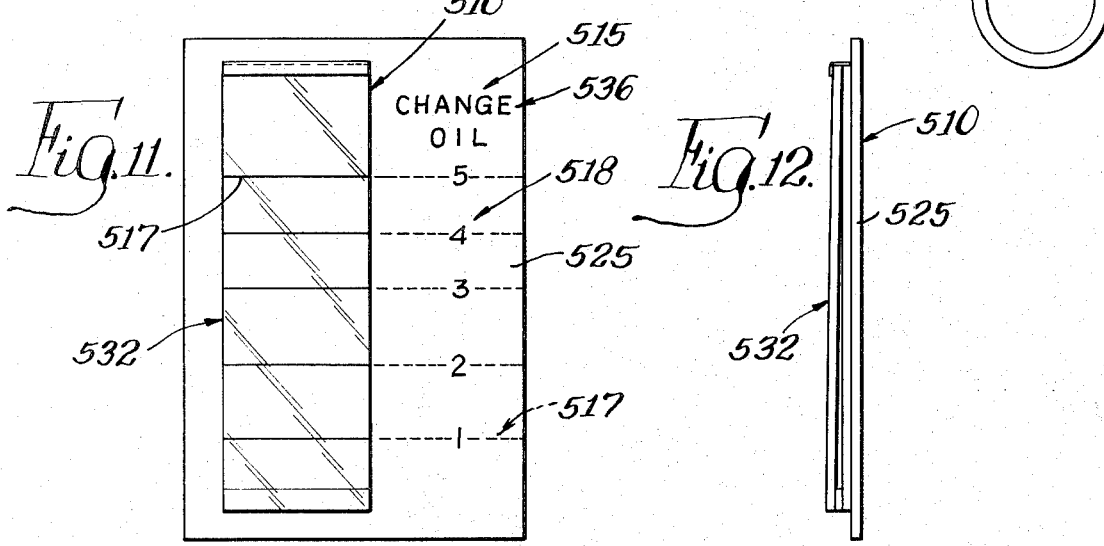
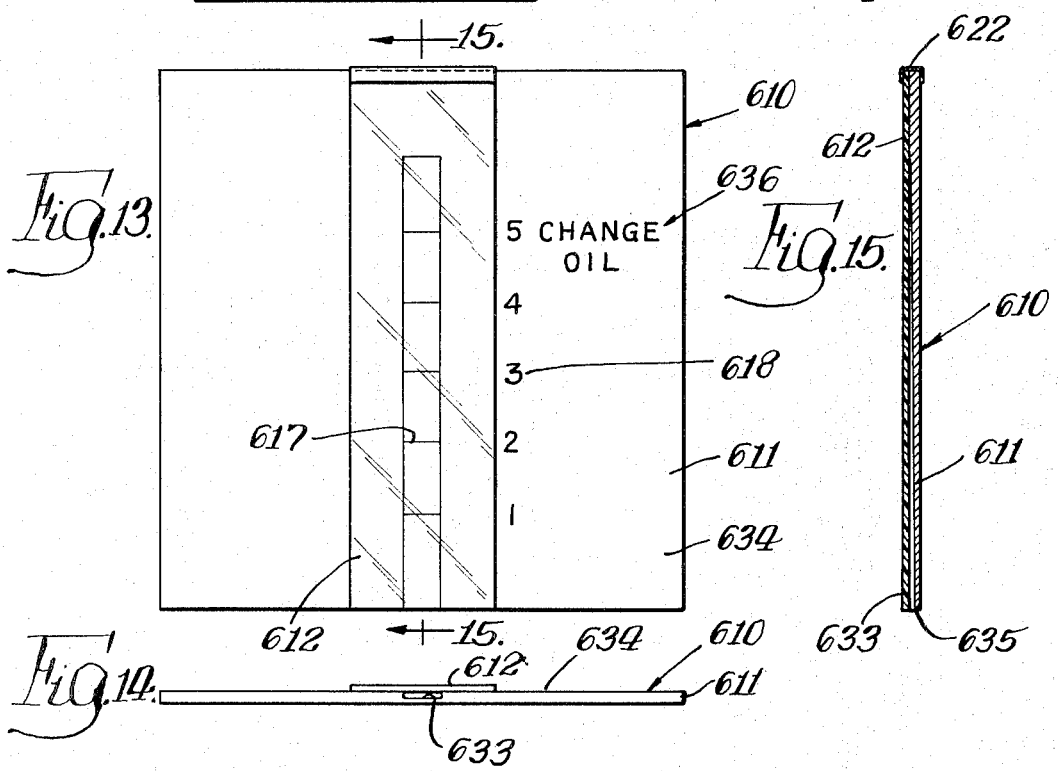

OIL CONDITION INDICATOR

This is a continuation, of application Ser. No. 144,863 filed May 19, 1971 now abandoned.

BACKGROUND OF THE INVENTION

1. Field of the Invention

This invention relates to indicating means and in particular to means for indicating the condition of a lubricating oil.

2. Description of the Prior Art

A number of devices has been developed for indicating to a user the condition of a liquid, such as engine oil. In one form as shown in U.S. Pat. No. 2,133,544 of J. K. Kolb, a pair of separable transparent walls define a holder for the oil sample. The walls are caused to have variable spacing so as to form a uniform thin light-transmitting film. Means are provided in the device for holding a clean sample of oil for comparison with the engine oil sample. Other U.S. Pats. showing the use of comparison means are John U.S. Pat. Nos. 1,854,143 and 1,925,254, and Garey U.S. Pat. No. 2,963,939. U.S. Pat. No. 2,622,471 to Sparks discloses an oil indicating means utilizing printed matter for indicating the quality of the oil.

A number of devices have been developed requiring the flow of the oil over an inclined plate. Illustrative of these devices are those disclosed in Turner et al Patent 2,486,080 and Thomas U.S. Pat. No. 2,068,476.

Another device for determining the quality of such oil is shown in the U.S. Pat. No. 209,924 to Rouaix wherein means are provided for determining the color change produced in oil by the adding of an acid. Another device for testing the oil condition is shown in U.S. Pat. No. 2,302,224 to Jones wherein absorption characteristics of the tester provide the means for determining the oil quality.

Devices using pistons and the like have been developed to provide such oil quality indication such as shown in U.S. Pat. No. 2,040,042 to Eckstein.

In another form of indicator used in determining engine oil quality, a piece of filter paper was provided onto which a drop of the oil sample was placed. The filter paper absorbed the fluid oil and the accumulated foreign matter was readily visible. Such indicating means did not indicate relatively small particles in the oil, such as those of colloidal size, including much of the carbonaceous particulate material. Because no completely effective means had been provided for providing a simple and economical indication of the condition of such engine lubricating oil, recourse has been had simply to utilization of the mileage or engine operating time as the indicator for the need of engine oil change. Such an indicating means has serious disadvantages because of wide variation in the parameters of the engine operation such as the engine condition, atmospheric conditions in which the engine is operated, driving habits of the operator, original quality of the oil, specific usage of the engine, such as for short run or long run operations, etc.

Other devices generally of the type disclosed above have been developed but none have been completely successful because of relatively high cost, difficulty of use, inaccuracy in reading, etc.

SUMMARY OF THE INVENTION

The present invention comprehends an improved means for indicating the condition of engine lubricating oil avoiding the disadvantages of the above discussed prior art devices in an extremely simple and economical manner.

More specifically, the present invention comprehends such an oil condition indicating means including a base member, a light-transmitting cover member overlying the base member, means for effecting a progressively increasing-in-thickness spacing between the members for holding a corresponding progressively increasing-in-depth sample of the lubricating oil therebetween, and indicium means on the base member viewable through the cover member and oil sample to an extent controlled by the opacity of the lubricating oil sample varying as a function of the thickness thereof thereby to indicate the condition of the oil as a function of the opacity. The respective members may comprise flat sheet elements hingedly connected for facilitated placement of the oil sample therebetween. The base member may comprise a single element or a composite structure. The base member may be light-transmitting or opaque. The indicium means may be brown in color for facilitated use in indicating the condition of the oil.

The cover member may be tubular having a frusto-conical well in one form of the invention. The indicator may be formed as a portion of a conventional engine crankcase dip stick means. The base member may include an integral handle for manipulating the indicating means.

In one form, the base member may comprise a member in facial engagement with the cover member and having a recess of progressively increasing depth to define the desired oil sample receiving space.

Thus, the oil condition indicating means of the invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a front view of an oil condition indicating means embodying the invention disposed in front of a light-transmitting sheet;

FIG. 2 is a side elevation thereof;

FIG. 3 is a perspective view showing the use of the indicating means separate from the light-transmitting sheet;

FIG. 4 is a front view of a modified form of oil condition indicating means embodying the invention;

FIG. 5 is a side elevation thereof;

FIG. 6 is a side elevation of another form of oil condition indicating means embodying the invention;

FIG. 7 is a front view thereof;

FIG. 8 is a perspective view of a further form of oil condition indicating means embodying the invention;

FIG. 9 is a broken front view of a still further form of oil condition indicating means embodying the invention;

FIG. 10 is a side elevation thereof;

FIG. 11 is a front view of yet another form of oil condition indicating means embodying the invention;

FIG. 12 is a side elevation thereof;

FIG. 13 is a front view of a still further form of oil condition indicating means embodying the invention;

FIG. 14 is an end elevation thereof; and

FIG. 15 is a transverse section taken substantially along the line 15—15 of FIG. 13.

DESCRIPTION OF THE PREFERRED EMBODIMENTS

In the exemplary embodiment of the invention as disclosed in FIGS. 1–3 of the drawing, an oil condition indicating means generally designated 10 is shown to comprise an indicator defined by a base member 11 and a light-transmitting cover member 12 overlying the base member. Means 13 are provided for effecting a progressively increasing-in-thickness spacing between members 11 and 12 for holding a corresponding increasing-in-depth sample 14 of lubricating oil therebetween. Indicium means 15 may be provided on the base member 11 to be viewable through the cover member 12 and the oil sample 14 to an extent controlled by the opacity of the lubricating oil sample varying as a function of the thickness. Thus, the condition of the oil is indicated by a correlation of the viewable indicium means with the increasing opacity of the oil toward the thick end of the wedge-shaped space 16 between members 11 and 12.

Thus, indicating means 10 utilizes the color change in the oil as an indication of the quality thereof. It has been found that conventional lubricating oil, as used in automobile engines and the like, changes in opacity as a result of the development of carbonaceous materials therein. The carbonaceous materials result from chemical changes in the oil as a result of the breakdown thereof in normal elevated temperature engine operation. Thus, the oil tends to become cloudy and dark, having a turbid brown color. It has further been found that additional foreign material is accumulated in the oil during the normal engine operation, such material comprising dust and dirt in the air utilized in burning of the fuel in the engine. The accumulated foreign material further causes darkening and turbidity of the oil. It has been found that the opacity, or optical density, of the oil varies substantially as a direct function of the thickness of the sample of the oil viewed by transmitted light.

The present invention comprehends the determination of the condition of the oil as a function of its opacity by providing a variable thickness of the oil sample correlated with the indicium means to provide a measured opacity reading. In the present invention, the indicium means comprises a plurality of lines 17 at spaced intervals along the indicator having corresponding numerals 18 associated respectively therewith. Thus, when the oil sample 14 is viewed through the cover member 12, the increasing thickness of oil will correspondingly cause an increasing opacity such that only certain of the lines 17 will be seen through the oil. The last viewable line indicates the degree of oil deterioration by indicating the degree of opacity of the sample.

In device 10, the base member 11 may be formed of light-transmitting material and the light for viewing the oil sample 14 may be provided by means of a conventional light box 19 having a light-transmitting sheet over which the indicator 10 is placed. Illustratively, such a light box is similar to those used in medical laboratories for reading blood types and agglutination tests. Alternatively, the device may be simply held up in space as shown in FIG. 3, or a simple conventional lamp 20 may be provided for providing the transmitted light.

Illustratively, members 11 and 12 may be hingedly joined at one end 21 by a hinge means such as hinge means 22, herein comprising a piece of adhesive tape turned around the end portion 21 of the juxtaposed members. The spacing means 13 may comprise a spacer having a predetermined height as discussed below. The spacer 13 may be secured to one or the other of members 11 and 12, such as by suitable adhesive means. Members 11 and 12 may comprise any suitable material substantially unaffected by contact therewith by aliphatic hydrocarbons, such as comprising conventional motor oil. Thus, members 11 and 12 may be formed of glass or suitable plastic materials as will be obvious to those skilled in the art.

Spacer 13 illustratively may have a height of approximately 0.02 inch to provide a space 16 varying from zero to 0.02 inch lengthwise of the indicator. The indicium means 15 may comprise printing on the base member 11. It has been found that the nature of the opacity of conventional engine lubricating oil permits improved condition indication by use of brown colored indicating lines and numerals. Illustratively, the lines may be relatively broad lines, such as lines having a width of 1/32 inch.

The use of the device is extremely simple. Thus, the operator merely swings the members 11 and 12 apart about hinge 22 and places several drops of oil from the engine crankcase on the base member. The cover member 12 is then swung back to the closed arrangement of FIG. 2, thereby causing the oil chamber 14 in space 16 to spread out and completely fill space 16 between the members 11 and 12. Illustratively, the oil sample may be obtained from the end of the dip stick.

It has been found that oil requiring replacement will have an opacity sufficient to prevent viewing by conventional light of the indicium portions spaced apart greater than approximately 4 to 6 mils. Thus, a blocking out of the indicium line 17 identified by the numeral 20 in the illustrated indicating means 10, would indicate a need for replacement of the oil. It has been found that clean oil will be sufficiently transparent to permit viewing of the entire indicium means 15 and, in fact, would permit viewing of indicium means through a thickness of up to 40 mils of such fresh oil. Thus, it may be seen that a wide range variation in the opacity of the oil as a function of the condition thereof is obtained and readily determined by means of device 10.

The testing of the oil condition by means of device 10 is extremely simple and the structure of device 10 is correspondingly extremely simple and economical. By making the device 10 of relatively inexpensive materials, such as transparent plastic materials, the cost thereof may be made so low as to permit a one-time use thereof. Thus, device 10 may effectively comprise a disposable oil indicator device. Examples of suitable plastics are acrylic and vinyl plastic materials. The spacer 13 may be made of metal, such as brass, plastic, treated paper, etc. While the indicium means 15 has been disclosed as having a brown color, and may have a brown color such as the color of raw umber, it has been found that other colors, such as black, blue and red, will also provide satisfactory indication.

The correlation between the visual turbidity or opacity of oil samples, the particulate matter, and the engine usage mileage of the oil producing such opacity, is illustrated in the following chart based on tests made in 1970:

| Visual Turbidity Appearance | Rank | ASTM Particulate Matter (ml.) | Specific Particle Count (1) | Oil Mileage | Car Year & Make |
|---|---|---|---|---|---|
| Clear | Clean 1 | 0 | 0 | None | — |
| Clear | 1 | 0 | 0 | None | — |
| Very slightly cloudy | 2 | <0.005 | 500 | 1,954 | 1969 Plymouth |
| Slightly cloudy | 3 | 0.005 | 650 | 1,685 | 1955 Chevrolet |
| Slightly cloudy | 4 | 0.005 | 350 | 3,293 | 1955 Ford |
| Medium cloudy | 5 | 0.005 | 1,450 | 1,100 | 1955 Chevrolet |
| Medium cloudy | 6 | 0.010 | 4,550 | 2,100 | 1964 Buick |
| Medium cloudy | 7 | 0.015 | 400 | 3,000 | 1964 Ford |
| Medium cloudy | 8 | 0.015 | 600 | 3,200 | 1964 Chevrolet |
| Cloudy | 9 | 0.015 | 1,500 | 3,461 | 1967 Plymouth |
| Cloudy | 10 | 0.020 | 2,400 | 3,946 | 1964 Ford |
| Cloudy | 11 | 0.020 | 3,600 | 2,500 | 1959 Ford |
| Cloudy | 12 | 0.020 | 2,400 | 2,224 | Int. Pickup |
| Cloudy | 12 | 0.025 | 2,400 | 2,586 | Int. Pickup |
| Very turbid | 13 | 0.020 | 1,300 | 4,460 | 1966 Buick |
| Very turbid | 14 | 0.015 | 2,400 | 3,705 | 1965 Buick |
| Very turbid | Dirty 15 | 0.025 | 2,800 | 8,325 | 1968 Plymouth |

Note: (1) Particles per cubic millimeter.

In testing the correlation between the opacity and oil condition, it has been found that the temperature of the oil sample does not substantially affect the validity of the determination but that the opacity is a function of the deterioration whether the oil sample is hot or cold. Thus, an accurate determination can be made by a gas station attendant or the like utilizing the indicator structure of the invention regardless of the engine operating condition at the time the sample is taken while yet providing the desired high accuracy oil condition indication.

The invention further comprehends modifications of the indicating means 10 illustratively shown in FIGS. 4–15. Thus, in FIGS. 4 and 5, a modified form of indicating means generally designated 110 is shown to comprise a device similar to device 10 but having an enlarged base member 111 providing improved facilitated handling of the device. Base member 111 may comprise an opaque element, such as formed of cardboard, having the indicium means 115 printed thereon for viewing by light passed downwardly through the cover member 112 and reflected back outwardly from the upper surface 123 of the base member 111.

In FIGS. 6 and 7, a further modified form of indicating means generally designated 210 is shown to comprise a device similar to device 110 but having a base member generally designated 211 comprised of a transparent upper element 224 and an opaque lower element 225. Elements 224 and 225 may be integrally joined such as by suitable adhesive means, or the device may comprise a structure generally similar to structure 10 adapted to be placed in overlying relationship to a separable base element 225 as desired. The indicium means 215 may be printed on the opaque base element 225 or may be provided on the transparent element 224 as desired.

In FIG. 8, a further modified form of indicating means embodying the invention is shown to comprise a generally tubular indicator generally designated 310 having a cover member defined by a cylindrical tubular portion 326 having a tapered lower end portion 327. The cover member defines a conical well 311 which narrows downwardly toward cover member 327. The cover member is formed of a light-transmitting material so as to permit viewing of an oil sample placed in well 311. As the cross-section of the oil sample varies as a direct function of the increasing radius of the well 311, a variable opacity indication is provided by viewing the oil sample by transmitted light. The indicium means 315 comprises circular lines 317 and corresponding numerals 318 provided on the cover member 312 on the rear portion thereof so as to be viewable through the front portion of the cover member and the oil sample. Thus, when the device 310 is held up to a source of light, the variable opacity of the oil sample will block out a certain portion of the indicium means to provide an indication of the oil condition similarly to the provision of the oil condition indication of the previously described condition indicating devices. In one form, the well 311 may comprise a through bore permitting introduction of the oil sample through the lower end thereof in cover member portion 327 such as by capillary or suction action. Where suction action is to be employed, a suitable resilient bulb may be attached to the upper end of the cover member portion 326.

Turning now to the embodiment of FIGS. 9 and 10, an indicating means generally designated 410 is shown to comprise an indicating means generally similar to indicating means 10 but of relatively small width adapted to be carried on the lower end 428 of a dip stick generally designated 429. Thus, the oil sample is automatically provided upon insertion of the dip stick end 428 into the engine crankcase and withdrawal therefrom permitting the oil to flow into the space 416 when submerged in the oil in the crankcase. Any suitable means may be provided for securing the indicator 410 to the dip stick portion 428 such as the tongue 430 received in a socket 431 at the end of the indicator 410 as shown in FIG. 10.

A further modified form of oil condition indicating means is shown in FIGS. 11 and 12 to comprise an indicating means generally designated 510 having a sample receiving portion 532 generally similar to indicator 210 of FIG. 6 and 7. However, in indicator 510, the base element 525 carries the numerals 518 of the indicium means 515 laterally of the sample holding means 532. The indicium lines 517 may alternatively be provided adjacent the numerals 518 laterally of the means 532 as shown in dotted lines in FIG. 11 or may be provided at the rear of the indicator portion 532 as shown in full lines therein.

In the embodiment of FIGS. 13-15, an indicating means generally designated 610 is shown to comprise an indicator having a base member 611 provided with an upwardly opening well 633 in the upper surface 634. Well 633, as best seen in FIG. 15, increases in depth to the front edge 635 of the base member 611. Cover member 612 comprises a flat transparent sheet hingedly connected to the base member by hinge means 622 to movably over-lie well 633 overlapping the well along the edges thereof to be in facial engagement with the upper surface 634 of the base member as best seen in FIG. 14. Thus, well 633 defines a progressively increasing-in-depth space between base member 611 and cover member 612 for providing a progressively increasing-in-thickness oil sample therein. The indicium means 615 may include indicium lines 615 on the base member at the rear of space 633. The indicium means numerals 618 may be provided alternatively in association with the lines 617 at the rear of space 633, or as shown in FIG. 13, laterally of the cover member 612 on the upper surface 634 of base member 611. As illustrated in the embodiments of FIGS. 11-15, a suitable wording generally designated 536 and 636 may be associated with the indicium line and numeral predetermined to indicate the level of opacity corresponding to an oil condition requiring change of the oil. Such wording indication may be obviously employed with any of the other forms of indicator device discussed above. In this respect, the different specific features of the different embodiments may, obviously, be utilized in conjunction with the other forms of disclosed indicator devices, as will be obvious to those skilled in the art, wherever appropriate.

In utilization of indicator 610, the operator may place an excess quantity of oil in the well. The placement of the cover member 612 thereover flattens the upper surface of the oil to give it a correspondingly flat configuration providing high accuracy in the variable depth arrangement.

The specific illustrated forms of indicating means are exemplary only. Other indicia, such as geometrical figures, emblems, wording, and the like, may be employed within the scope of the invention.

Corresponding elements of the different embodiments are identified by corresponding similar reference numerals except 100 higher.

The foregoing disclosure of specific embodiments is illustrative of the broad inventive concepts comprehended by the invention.

We claim:

1. Throw-away means for indicating the condition of engine lubricating oil, comprising: a base member formed of low cost substantially nonfrangible sheet material; a light-transmitting substantially nonfrangible synthetic plastic flat cover member overlying said base member, said base member defining a well opening toward the cover member and having a progressively increasing depth for holding a corresponding progressively increasing-in-depth sample of the lurbicating oil therein, said well further opening flush to one edge of said cover member at a maximum depth portion thereof and terminating short of the opposite edge of said base member, said one edge of the cover member being congruent with the corresponding edge of said base member laterally of said well; and indicium means associated with said base member viewable through said cover member and oil sample to an extent controlled by the opacity of the lubricating oil sample thereat thereby to indicate the condition of the oil as a function of said opacity, said base member having a substantial extent between said well and said opposite edge thereof and being adapted to carry wording thereon for providing information to the user.

* * * * *